(12) United States Patent
Halin et al.

(10) Patent No.: US 12,398,834 B2
(45) Date of Patent: Aug. 26, 2025

(54) FLUIDIC CONNECTOR AND METHOD FOR ASSEMBLING IT

(71) Applicant: HUTCHINSON, Paris (FR)

(72) Inventors: Mickaël Halin, La Ciotat (FR); Julien Mongendre, Sury Aux Bois (FR); Fabien Bordinat, Montargis (FR)

(73) Assignee: HUTCHINSON, Paris (FR)

( * ) Notice: Subject to any disclaimer, the term of this patent is extended or adjusted under 35 U.S.C. 154(b) by 89 days.

(21) Appl. No.: 18/491,239

(22) Filed: Oct. 20, 2023

(65) Prior Publication Data

US 2024/0142030 A1 May 2, 2024

(30) Foreign Application Priority Data

Oct. 28, 2022 (FR) ..................................... 2211282

(51) Int. Cl.
| | |
|---|---|
| *F16L 37/084* | (2006.01) |
| *F16L 37/088* | (2006.01) |
| *F16L 37/12* | (2006.01) |
| *F16L 37/14* | (2006.01) |

(52) U.S. Cl.
CPC ....... *F16L 37/0841* (2013.01); *F16L 37/0885* (2019.08); *F16L 37/1225* (2013.01); *F16L 37/144* (2013.01)

(58) Field of Classification Search
CPC ... F16L 37/0841; F16L 37/0885; F16L 37/14; F16L 37/144; F16L 37/1225
See application file for complete search history.

(56) References Cited

U.S. PATENT DOCUMENTS

| | | | | |
|---|---|---|---|---|
| 7,201,403 | B2* | 4/2007 | Takayanagi | F16L 37/0885 |
| 7,387,318 | B2* | 6/2008 | Yoshida | F16L 37/0885 |
| 7,438,328 | B2 | 10/2008 | Mori | |
| 11,168,819 | B2 | 11/2021 | Gaudiau | |
| 2013/0140808 | A1* | 6/2013 | Bongiorni | F16L 37/0885 |
| 2019/0293102 | A1* | 9/2019 | Nezu | F16L 37/0841 |
| 2023/0108924 | A1* | 4/2023 | Teasley | F16L 37/1225 |

FOREIGN PATENT DOCUMENTS

| | | |
|---|---|---|
| AT | 512397 B1 | 8/2013 |
| KR | 1509192 B1 * | 4/2015 |

OTHER PUBLICATIONS

KR-1509192-B1—Machine Translation—English (Year: 2015).*
French Search Report received for FR Application No. 2211282 on Apr. 21, 2023, 2 pgs.

* cited by examiner

*Primary Examiner* — William S. Choi
(74) *Attorney, Agent, or Firm* — Merchant & Gould P.C.

(57) ABSTRACT

A fluidic connector includes a female tubular fitting, a male tubular fitting, and a generally U-shaped metal pin mounted astride the female fitting. The pin is axially movable on the female fitting from an inoperative position in which branches of the pin are held spaced apart by the female fitting, to an operative position in which portions of the branches are located at the level of at least one slit of the female fitting and are able to pass through the slit by elastic return. The male fitting includes a part configured to be engaged in the female fitting and to cooperate directly with the branches of the pin move the male fitting from its inoperative position to its operative position.

16 Claims, 12 Drawing Sheets

FLUIDIC CONNECTOR AND METHOD FOR ASSEMBLING IT

CROSS-REFERENCE TO RELATED APPLICATION

This application claims priority from Patent Application No. 2211282 filed on Oct. 28, 2022 in France. The entire contents of the priority application is incorporated herein by reference.

TECHNICAL FIELD OF THE INVENTION

The present invention relates to a fluidic connector and its assembly method.

PRIOR ART

The technical background comprises the documents U.S. Pat. No. 11,168,819B2, AT-B1-512 397 and U.S. Pat. No. 7,438,328B2.

A fluidic connector is a device that allows to connect two tubular fittings in a fluidic circuit to allow the circulation of fluid through the fittings and into the circuit. The two fittings are generally male and female fittings and therefore this two fittings are connected by a male-female fitting.

To prevent accidental disconnection of the two fittings of the connector, the connector has been known to be equipped with a lock. The lock is carried by one of the fittings, for example the female fitting. When the male and female fittings are engaged, the lock can cooperate with the male fitting to retain it axially in the female fitting. In this case, the axial direction is the direction in which the fittings engage with each other.

In the context of the present invention, the lock is a metal pin which is generally U-shaped and is mounted astride the female fitting. The pin comprises two lateral branches which pass through slits in the female fitting and can engage in a gorge in the male fitting.

The pin is elastically deformable by moving its branches apart and close together. When the branches are moved close together, they engage in the gorge of the male fitting and block it axially with respect to the female fitting. When the branches are spaced apart, they are extracted from the gorge of the male fitting, which can be removed from the female fitting by axial translation.

The passage from the spaced apart position to the close together position of the branches of the pin is preferably carried out automatically by elastic return of these branches. In practice, when the male fitting is inserted into the female fitting, the male fitting rests on the branches of the pin and pushes them radially outwards to space them apart from each other. The radial direction is expressed here in relation to the aforementioned axis. This insertion is continued until the gorge of the female fitting and the pin are located in the same plane perpendicular to the axis. The branches then move close together by elastic return and are housed into the gorge of the female fitting.

In the current technique, it is a frustoconical part of the male fitting that cooperates with the branches of the pin when it is inserted into the female fitting. During the insertion, the branches move apart from each other as they slide over this frustoconical part, from the axial end of the smaller diameter of this frustoconical part to its axial end of larger diameter.

The axial retention capacity of the male fitting in the female fitting depends in particular on the force required to move the branches apart. It is therefore preferable for this force to be relatively high, to avoid the branches moving apart unintentionally. To generate this force, it is necessary to force-fit the male fitting into the female fitting so that, as mentioned above, the male fitting cooperates with the branches and exerts the force required to move them apart.

With the current technology, the male fitting is forced-fitted into the female fitting manually, which can be difficult for an assembly operator to do.

The present invention is an improvement on the current technology, providing a simple, effective and economical solution to this problem.

SUMMARY OF THE INVENTION

The invention relates to a fluidic connector, comprising:
a female tubular fitting with a first axis,
a tubular male fitting having a second axis and configured to be engaged coaxially with the female fitting, and
a generally U-shaped metal pin mounted astride the female fitting, this pin comprising two lateral branches, portions of which are configured to pass through at least one slit in the female fitting and to be engaged in a gorge in the male fitting to block it axially relative to the female fitting, the pin being elastically deformable by moving its branches apart and close together and being able to adopt several configurations, in particular between a close together configuration in which said portions are at a distance D1 from each other and are housed in the gorge, and a spaced apart configuration in which said portions are at a distance D2 from each other and allow the male fitting to be removed from the female fitting, D2 being greater than D1, characterised in that the pin is axially movable on the female fitting from an inoperative position in which its branches are held spaced apart by the female fitting so that said portions are at a distance D3 from one another, D3 being between D1 and D2, to an operative position in which said portions are located at the level of said at least one slit and are able to pass through it by elastic return, and in that the male fitting comprises a part configured to be engaged in the female fitting and comprising an external diameter which is greater than D3, so that, when the male fitting is engaged in the female fitting, this part cooperates directly with said portions to move the pin from its inoperative position to its operative position.

In the present application, "position" means a position of the pin and in particular two positions are defined for the pin, namely an inoperative position and an operative position. By "configuration" we mean the state of the branches of the pin, more or less spaced apart or close together. The branches can be in a position (extreme—corresponding to the distance D2) that is spaced apart enough for the male fitting to disengage from the female fitting. The branches can be in a position (extreme—corresponding to the distance D1) close together to allow the axial locking of the male fitting in the female fitting. The branches can also be in an (intermediate—corresponding to the distance D3) spaced apart position to cooperate with the male fitting when it is inserted into the female fitting.

In the prior technology, the branches of the pin can adopt essentially two extreme "stable" configurations, namely a spaced apart configuration and a close together configuration. In the present invention, the pin can adopt an intermediate "stable" configuration in which its branches are spaced apart but less than in the extreme spaced apart configuration.

The connector according to the invention is intended to be delivered with its pin whose branches are in this intermediate configuration. As a result, when an operator engages the male fitting in the female fitting, the force required to space the branches apart is lower than in the prior technique, since the branches are already slightly spaced apart. This is because the force required corresponds to the spacing of the branches from this intermediate configuration to the extreme spaced apart configuration (and not from the extreme close together configuration to the extreme spaced apart configuration). This makes it easier for the operator to mount the fittings.

It is therefore understood that the pin is mounted on the female fitting in a pre-stressed manner so that its branches are already spaced apart from each other in the inoperative position. It is also understood that the pin is moved axially on the female fitting to pass from its inoperative position to its operative position in which its branches can be housed in the gorge of the male fitting by elastic return.

In the present invention, it is the male fitting that cooperates with the pin and moves it over the female fitting. The force with which the male fitting engages the female fitting therefore firstly moves the pin on the female fitting and secondly moves the branches of the pin further apart. This force is still less than the force required in the prior technique to move the branches apart between their end positions.

In this application, "upstream" and "downstream" are also defined as locations relative to the direction of engagement of the male fitting in the female fitting. The male fitting thus has an upstream free end which is engaged in a downstream free end of the female fitting.

The connector according to the invention may comprise one or more of the following characteristics, taken in isolation from each other, or in combination with each other:

- in said operative position, the pin extends mainly in a plane perpendicular to said first axis, and in said inoperative position, the pin extends mainly inclined with respect to said first axis;
- in said inoperative position, the pin is inclined so that free ends of the branches are located downstream relative to opposite ends of the branches, with respect to a direction of engagement of the male fitting in the female fitting;
- the female fitting comprises two slits which are substantially diametrically opposed with respect to said first axis and which each have an elongated shape in the circumferential direction about this first axis, each of these slits being intended to be passed through by one of said portions;
- the female fitting further comprises two notches which are substantially diametrically opposed with respect to said first axis and which communicate respectively with said slits, each of the notches having a lateral wall which is inclined with respect to a plane perpendicular to said first axis and on which one of said portions is adapted to engage by axial abutment when the pin is in its inoperative position;
- each of the notches is generally V-shaped or wedge-shaped and comprises a thin end and a widened end located on the side of a free end of the corresponding branch;
- each of the notches comprises a first part which opens into the interior of the female fitting, and a second part which defines a step, this step being configured to cooperate by radial abutment with a free end of the corresponding branch, in order to hold the pin in its inoperative position;
- said step comprises a projecting wedge on the side of the corresponding slit, this projecting wedge comprising a lug for retaining the pin in its inoperative position;
- said step is connected, on the side opposite the lug, to a stop for the pin;
- the steps of the female fitting comprise parallel sliding surfaces of the free ends of the branches;
- in its operative position, the pin is able to move in a plane perpendicular to said first axis, and in its inoperative position, the pin is able to move in a different plane, which is preferably inclined with respect to said first axis;
- said part of the male fitting is a frustoconical part which comprises an upstream end of smaller diameter and a downstream end of larger diameter, this part cooperating by bearing with said portions in areas which are closer to its downstream end than to its downstream end;
- the female fitting comprises recesses which are substantially diametrically opposed with respect to said first axis, and which are configured to accommodate bent free ends of said branches when the pin is moved from its operative position to a disassembly position in which the pin has said spaced apart configuration;

The present invention also relates to a fluid circuit for a motor vehicle, comprising at least one connector as described above.

The present invention also relates to a method for assembling a fluidic connector as described above, comprising the steps of:

- mounting the pin on the female fitting, with the pin in its inoperative position, and
- engaging the male fitting in the female fitting, this engagement causing the pin to move from its inoperative position to its operative position in which said portions are located at the level of said at least one slit and are housed in the gorge of the male fitting by elastic return.

BRIEF DESCRIPTION OF THE FIGURES

Further characteristics and advantages will be apparent from the following description of a non-limiting embodiment of the invention with reference to the appended drawings in which.

DETAILED DESCRIPTION OF THE INVENTION

FIGS. 1 to 12b illustrate an embodiment of a fluidic connector 10 according to the invention.

Figure 9:
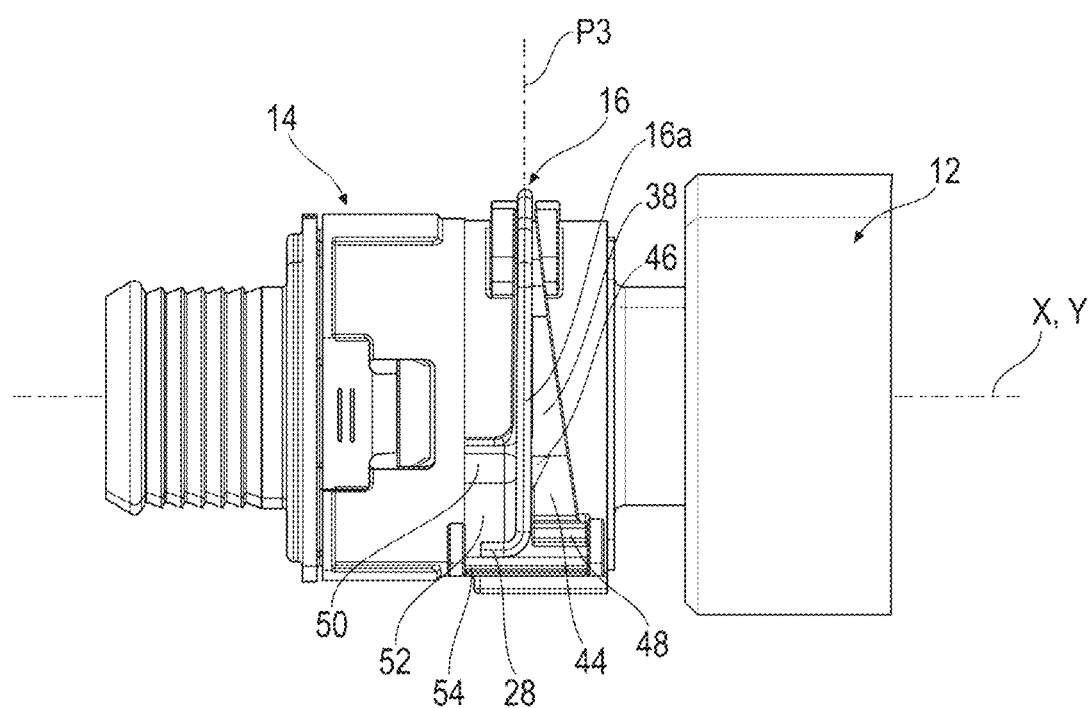
FIG. 9 is a schematic side view of the connector according to the invention, which comprises the female fitting and the pin of FIG. 1 as well as the male fitting of FIG. 2, and illustrates the pin in an operative position and its branches in a close together configuration.
Figure 10:
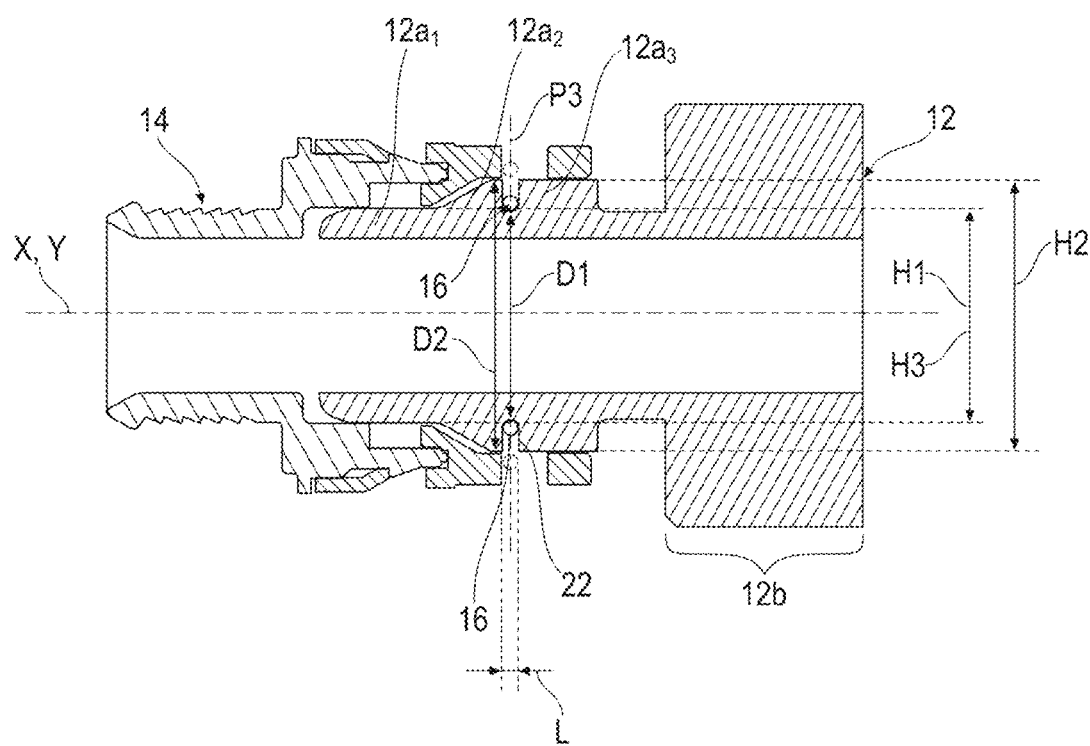
FIG. 10 is a schematic axial sectional view of the connector shown in FIG. 9.

The connector 10 is shown complete in FIGS. 9 and 10.

The connector 10 essentially comprises three elements: a male fitting 12, a female fitting 14 and a pin 16.

Figure 1:
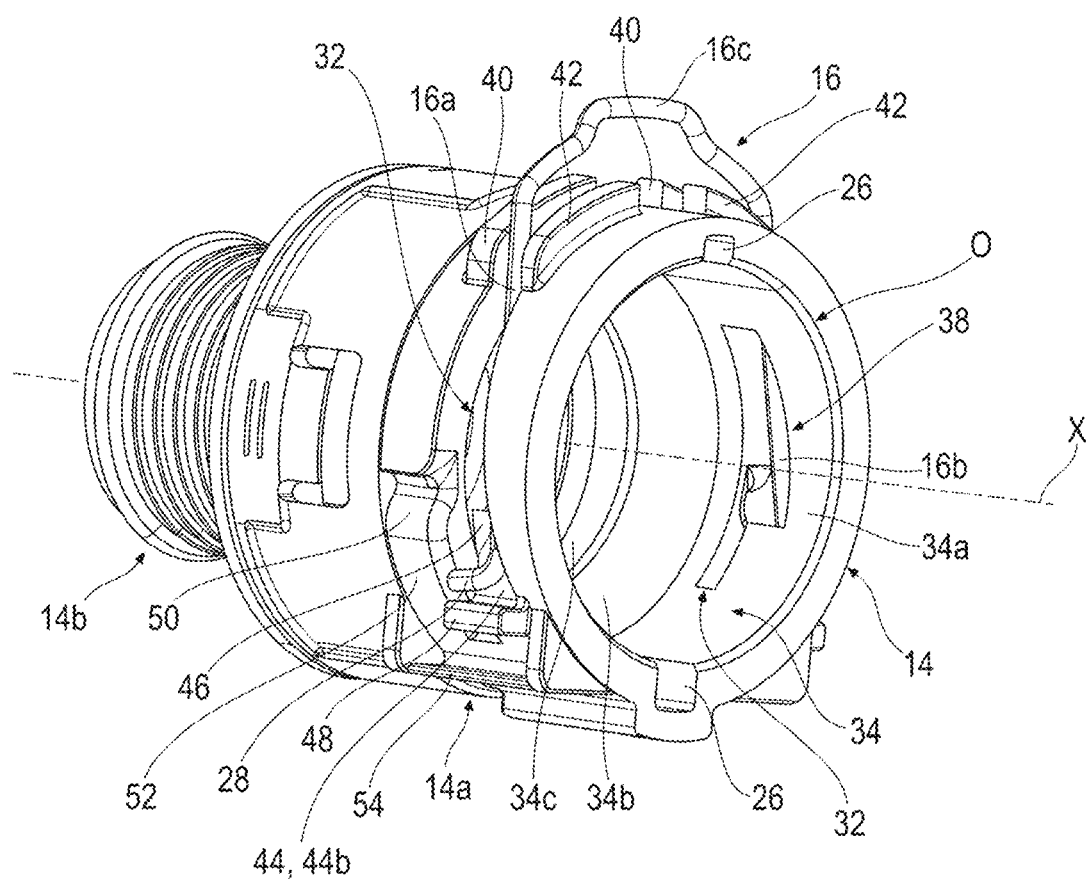
FIG. 1 is a schematic perspective view of a female fitting and a pin for a connector according to the invention.
Figure 2:
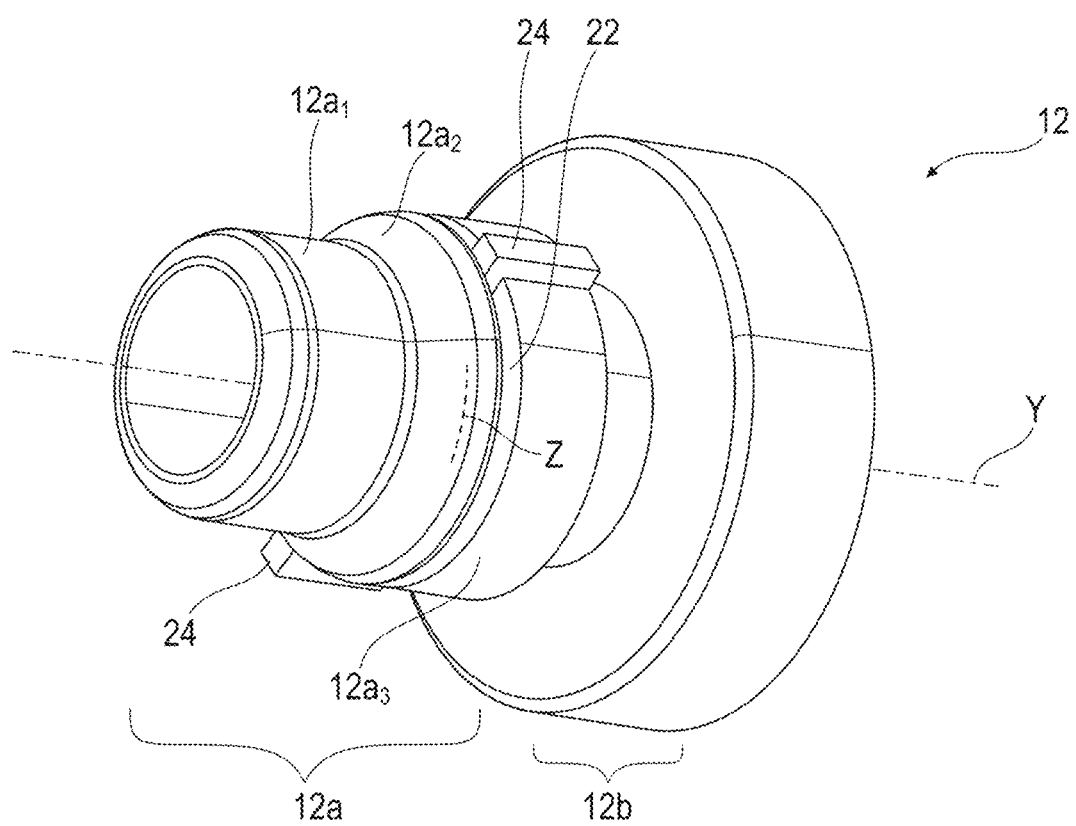
FIG. 2 is a schematic perspective view of a male fitting for a connector according to the invention.
Figure 3:
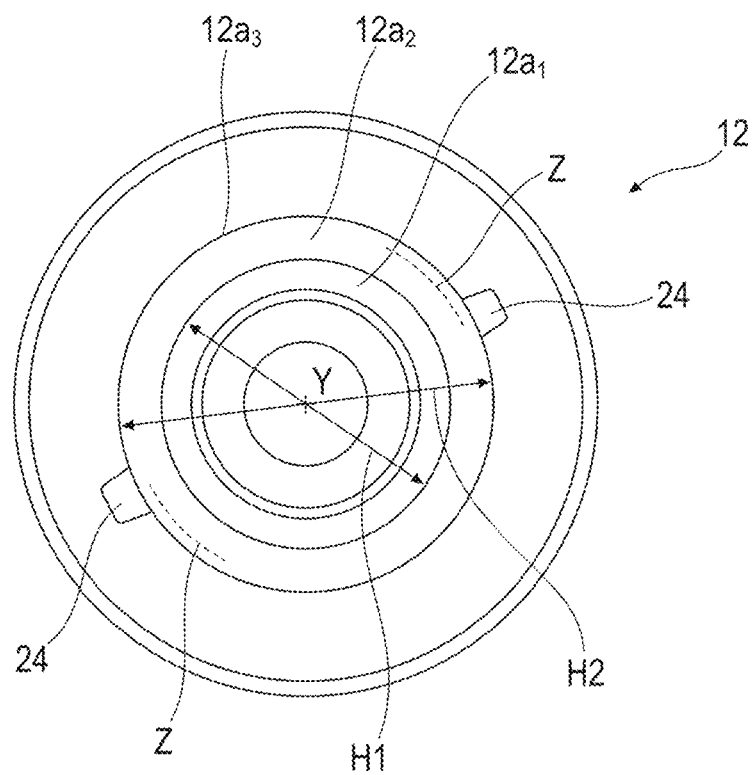
FIG. 3 is a schematic front view of the male fitting shown in FIG. 2.

The male fitting 12 is shown on its own in FIGS. 2 and 3. The pin 16 is shown on its own in FIG. 7. The female fitting 14 equipped with the pin 16 can be seen in FIGS. 1, 4a-4b, 5, 6a-6b, 8a-8b11 and 12a-12b.

We are going to describe the elements of the connector 10 one after the other.

The male fitting 12 (FIGS. 2 and 3) is generally tubular in shape and comprises a main axis Y corresponding to the axis of elongation of its internal passage. Although the male fitting 12 has a straight elongated shape in the drawings, it could alternatively have a bent shape.

The male fitting 12 comprises two axial stretches 12a, 12b. The first stretch 12a is an engagement stretch designed to be engaged in the female fitting 14. The second stretch 12b is a connection stretch designed to be connected to a pipe or a conduit of a fluid circuit.

The stretch 12a comprises three successive parts, namely a cylindrical part 12a1, a frustoconical part 12a2 and another cylindrical part 12a3. The part 12a1 has a diameter H1 and the part 12a3 has a diameter H2 which is greater than H1. The part 12a2 extends from the part 12a1 to the part 12a3 and therefore has a diameter that varies from H1 to H2. The part 12a3 is located on the same side as the stretch 12a, and the part 12a1 is located on the opposite side to the stretch 12a and forms a free end of the male fitting 12.

The male fitting 12 comprises an annular gorge 22 at its external periphery. In the example shown, this gorge 22 is located in the part 12a3 and close to the part 12a2 (or at the intersection between the parts 12a2 and 12a3).

The gorge 22 has an axial dimension L. The gorge 22 has an internal diameter H3 and an external diameter H2 (FIG. 10). In the example shown, H3 is greater than or equal to H1.

The male fitting 12 may also comprise at least one projecting or hollow member 24, for example on its part 12a3, which is configured to cooperate by interlocking with a complementary member 26 of the female fitting 14. In the example shown, there are two members 24, diametrically opposed. They project from the part 12a3 and have a generally elongated shape along the axis Y. The cooperation of the members 24, 26 may have an indexing and/or translational guiding function for the male fitting 12 in the female fitting 14.

The fitting 12 can be made of plastic, metal or a composite material. It can be integrally made.

The pin 16 (FIG. 7) is generally U-shaped and astride the female fitting 14 as shown in FIG. 1. The pin 16 comprises two lateral branches 16a, 16b which are connected by an intermediate bridge 16c.

In the example shown, the branches 16a, 16b are essentially straight but could alternatively be curved. The free ends 28 of the branches 16a, 16b opposite the bridge 16c are bent or curved, for example at 90°.

The bridge 16c can be of any shape, for example curved. Preferably, it comprises a median part 30 to make it easier for an operator to grip the pin 16, either directly by hand or using a tool.

The pin 16 is elastically deformable by moving its branches 16a, 16b apart and close together. The pin 16 can adopt several configurations, in particular between a close together (extreme) configuration visible in FIGS. 9 to 11, and a spaced apart (extreme) configuration visible in FIGS. 10, 12a and 12b.

The branches 16a, 16b have portions 31 configured to pass through at least one slit 32 in the female fitting 14 and to engage in the gorge 22 in the male fitting 12 to block it axially with respect to the female fitting 14.

Figure 11:
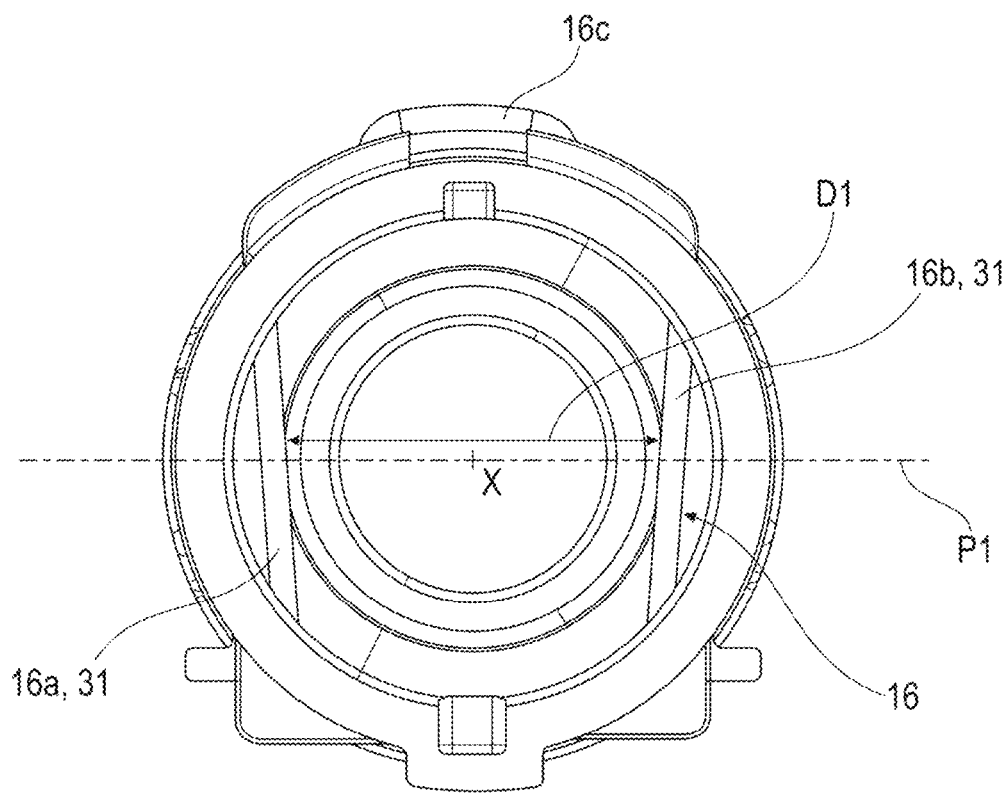
FIG. 11 is a schematic front view of the connector in FIG. 9 without the male fitting.

When the branches 16a, 16b are in the (extreme) close together configuration visible in FIGS. 9 to 11, the portions 31 are at a distance D1 from each other (FIGS. 10 and 11). In this configuration, the branches 16a, 16b and their portions 31 are not necessarily parallel and the distance D1 is the smallest distance measured between the branches 16a, 16b inside the female fitting 14 and in a plane P1 passing through the axis X of the female fitting 14 (FIG. 11). In this configuration and as illustrated in FIG. 10, the portions 31 are housed in the gorge 22 and it is therefore understood that the distance D1 is close to or equal to H3.

When the branches 16a, 16b are in the (extreme) spaced apart configuration shown in dotted lines in FIG. 10, the portions 31 are at a distance D2 from each other. In this configuration, the branches 16a, 16b and their portions 31 are not necessarily parallel and the distance D2 is the smallest distance measured between the branches 16a, 16b in a plane P1 passing through the axis X of the female fitting 14. In the example shown, D2 is close to or equal to H2. D2 is therefore greater than D1. In this configuration, the branches 12a, 12b and their portions 31 are no longer housed in the gorge 22 of the male fitting 12, which can be removed by pulling the female fitting 14 axially.

Figures 8A, 8B:
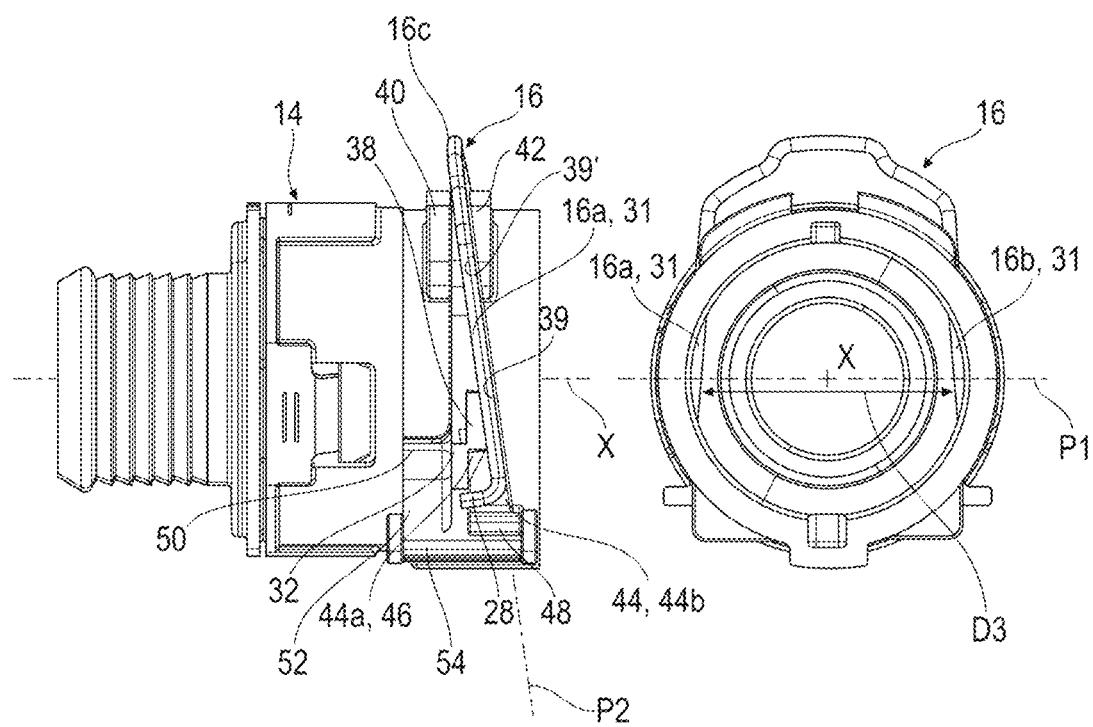
FIGS. 8a and 8b are schematic side and front views, respectively, of the female fitting and of the pin of FIG. 1, and illustrate the pin in an inoperative position.

According to the invention, the pin 16 can adopt an intermediate spaced apart configuration, as shown in FIGS. 8a and 8b. In this configuration, the portions 31 are at a distance D3 from each other (FIG. 8b). The branches 16a, 16b and their portions 31 are not necessarily parallel and the distance D3 is the smallest distance measured between the branches 16a, 16b inside the female fitting 14 and in a plane P1 passing through the axis X of the female fitting 14.

The distance D3 lies between D1 and D2 and therefore between H1 and H2. It is therefore understood that the frustoconical part 12a2 of the male fitting 12 is able to cooperate with the portions 31 of the pin 16 when its branches 16a, 16b are in this configuration. The cooperation of the male fitting 12 with the pin 16 will be described in detail after the female fitting 14 has been described in detail.

Figures 12A, 12B:
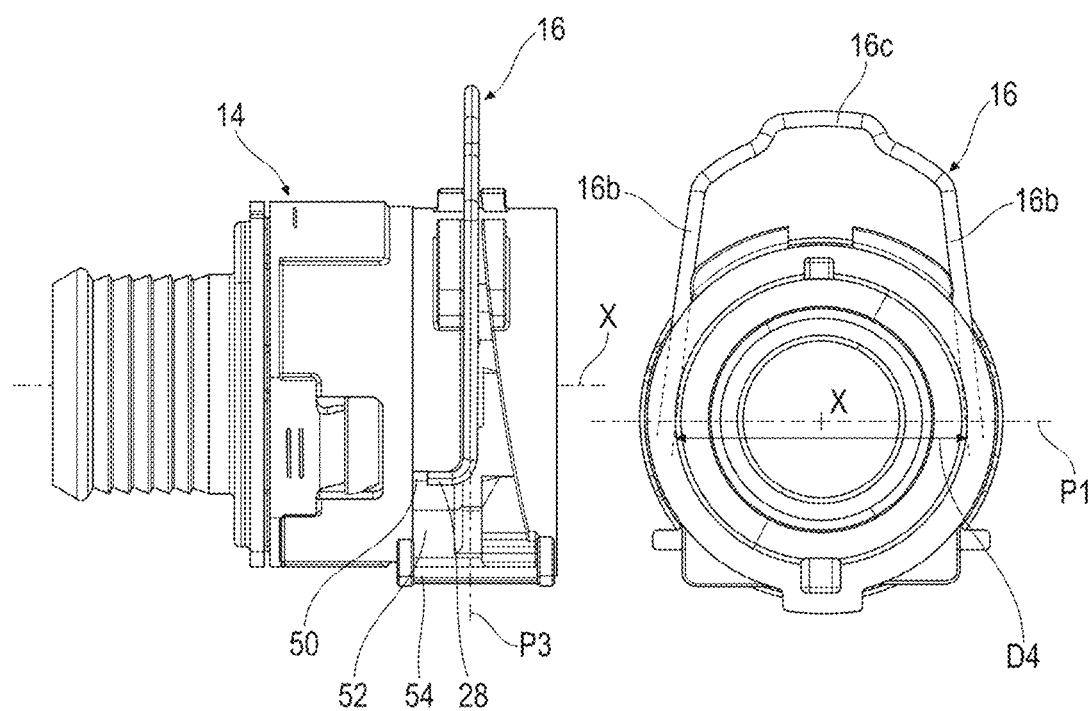
FIGS. 12a and 12b are schematic side and front views respectively of the female fitting and of the pin of FIG. 1, and illustrate the pin in a position in which its branches are in a spaced apart configuration.

When the branches 16a, 16b are in the (extreme) spaced apart configuration visible in FIGS. 12a and 12b, the portions 31 are at a distance D4 from each other. In this configuration, the branches 16a, 16b and their portions 31 are not necessarily parallel and the distance D4 is the greatest distance measured between the branches 16a, 16b in a plane P1 passing through the axis X of the female fitting 14 (FIG. 12b). In the example shown, D4 is greater than D2. The pin 16 can be held in this configuration by its branches 16a, 16b and in particular its ends 28 cooperating with the female fitting 14.

The pin 16 is made of metal.

The female fitting 14 (FIGS. 4a and 4b) is generally tubular in shape and has a main axis X corresponding to the axis of elongation of its internal passage. Although the female fitting 14 has a straight elongated shape in the drawings, it could alternatively have a bent shape. When the male fitting 12 engages in the female fitting 14, the axes X and Y are coincident or aligned.

Figure 4A:
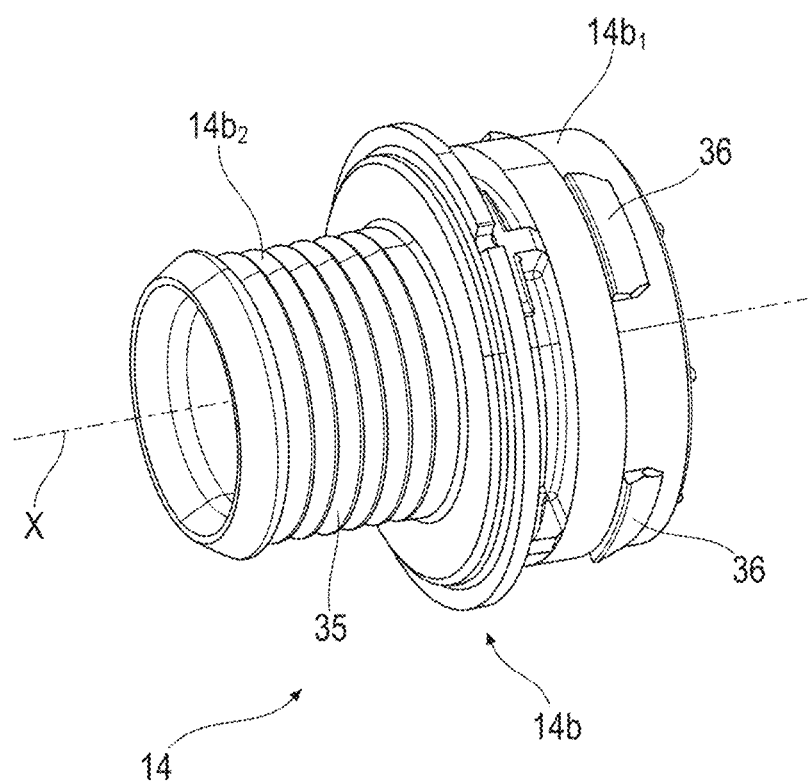
FIGS. 4a and 4b are schematic perspective views of two parts of the female fitting of FIG. 1.
Figure 4B:
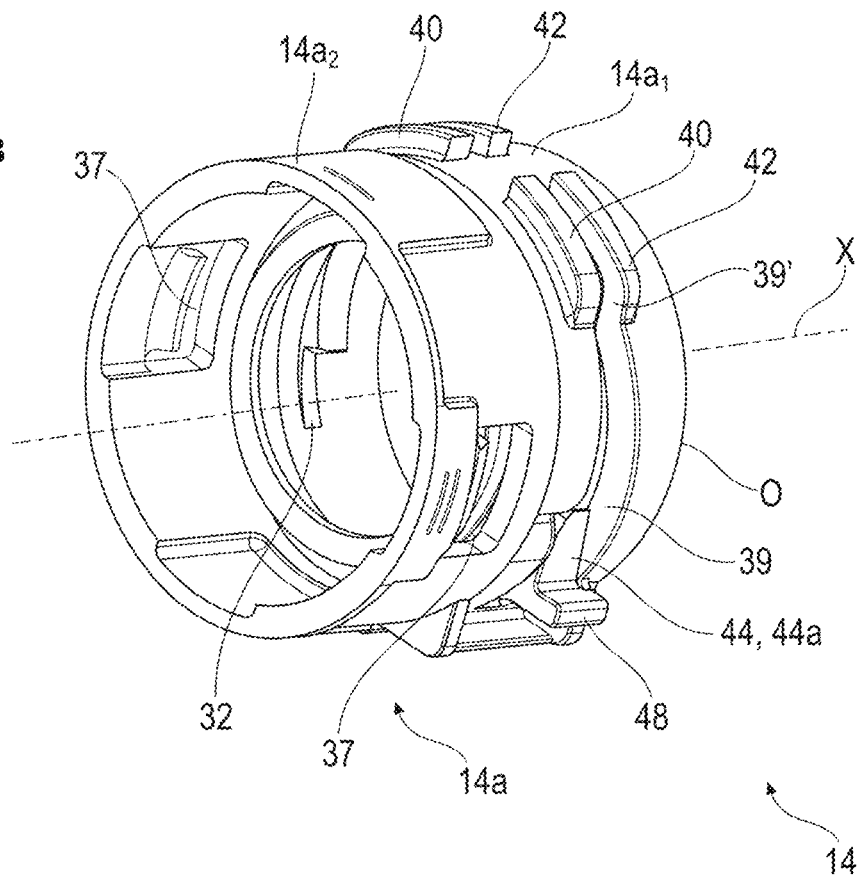
Figure 5:
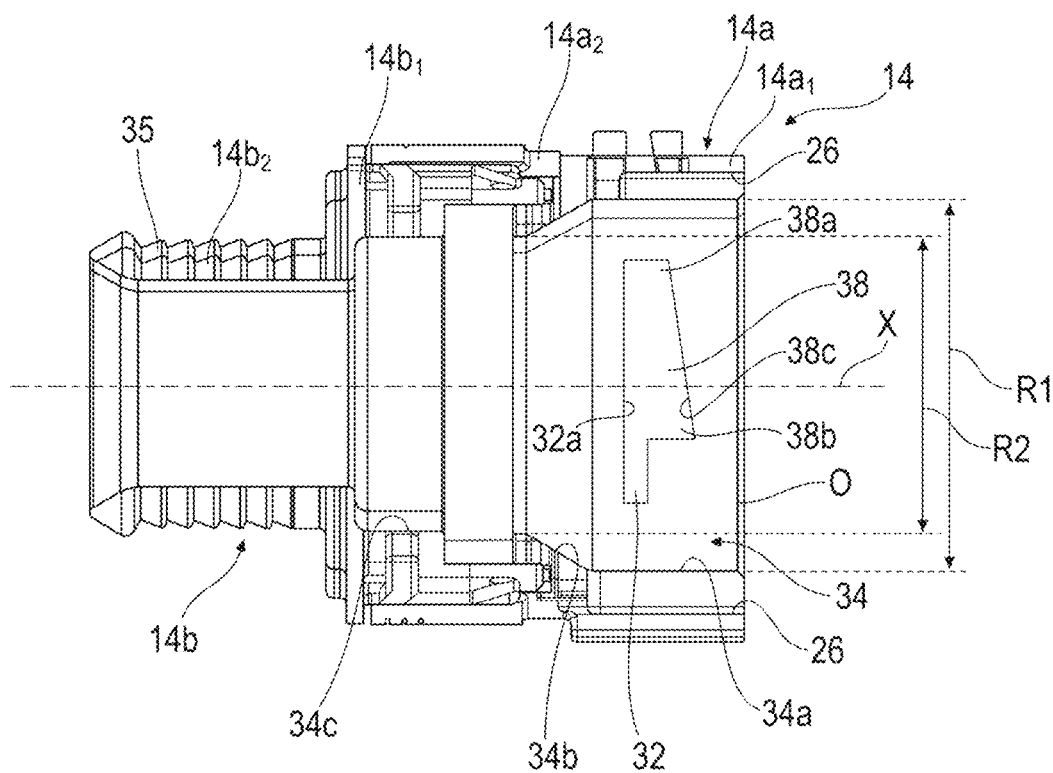
FIG. 5 is a schematic axial sectional view of the female fitting shown in FIG. 1.
Figure 6A:
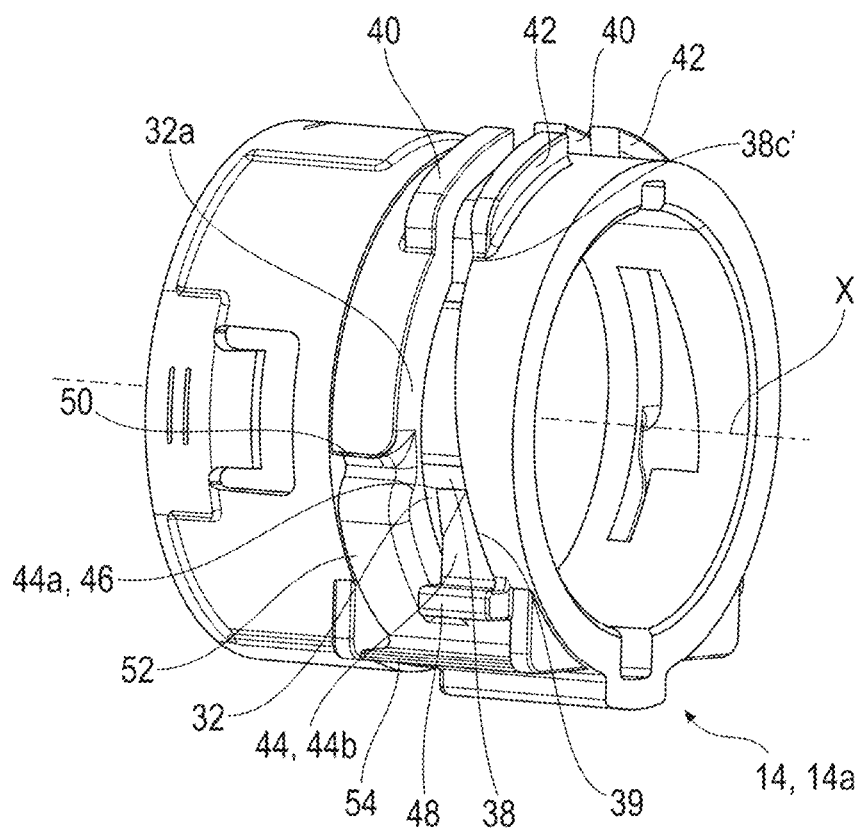
FIGS. 6a-6b are schematic perspective views of one of the parts of the female fitting shown in FIG. 1.
Figure 6B:
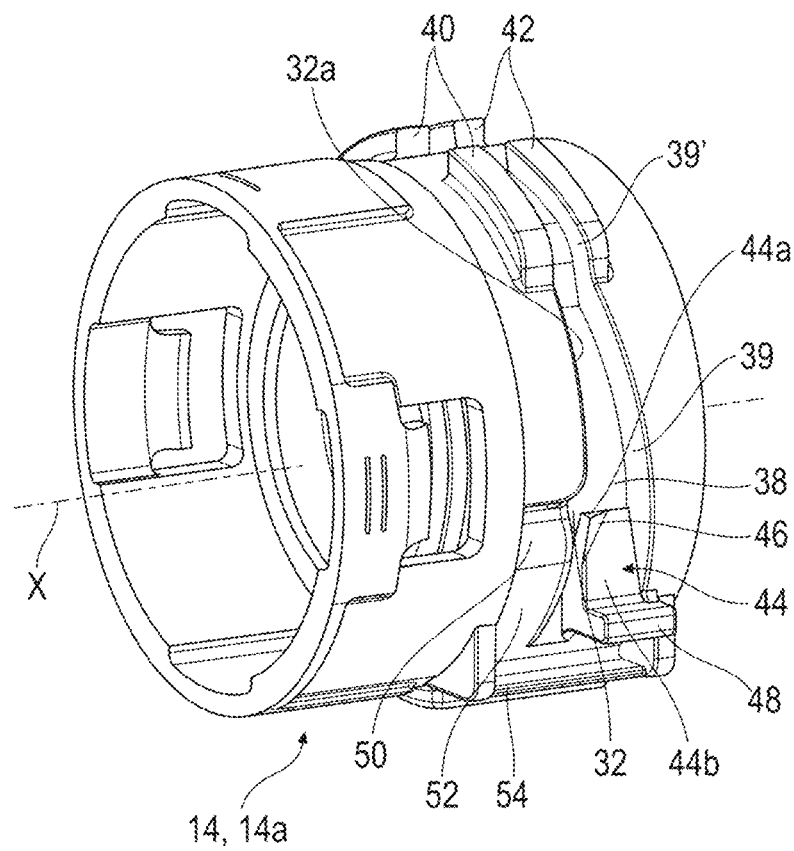
Figure 7:
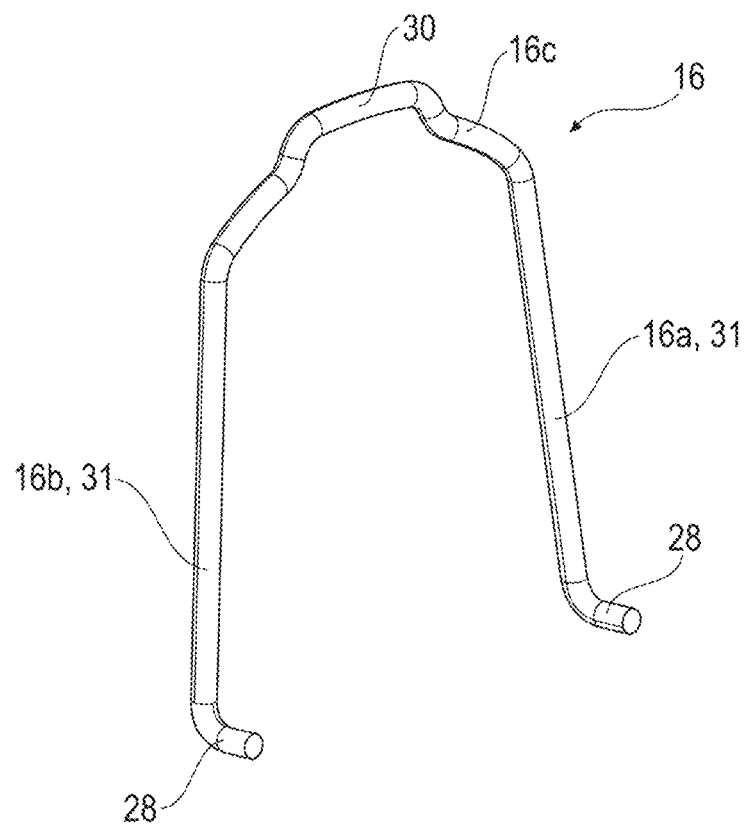
FIG. 7 is a schematic perspective view of the pin shown in FIG. 1.

The female fitting 14 comprises two parts 14a, 14b in the example shown, which are separated from each other in FIGS. 4a and 4b. Alternatively, the female fitting 14 could be formed from a single piece.

The two parts 14a, 14b are designed to be nested into each other. The part 14a in FIG. 4b is an engagement part, a first stretch 14a1 of which is designed to receive the male fitting 12 and a second stretch 14a2 of which is designed to receive the other part 14b.

The part 14b of FIG. 4a is a connection part, a first stretch 14b1 of which is intended to be engaged in the stretch 14a2 and a second stretch 14b2 of which is intended to be connected to a pipe or a conduit of a fluid circuit. This second stretch 14b2 may, for example, comprise an external thread or anchoring ribs 35, although this aspect is not limitative.

In the example shown, which is not limitative, the part 14b and in particular its stretch 14b1 comprises tabs 36 distributed around the axis X and configured to cooperate by elastic snap-fitting with complementary means 37 of the part 14a and in particular of the stretch 14a2 of the latter. This cooperation and the mounted position of the parts 14a, 14b in each other can be seen in FIG. 5.

The female fitting 14 comprises an internal passage 34 comprising three parts 34a, 34b and 34c designed to receive the male fitting 12. The part 34a is a part with a larger diameter R1 which is slightly larger than the diameter H2 so that this part 34a can accommodate the part 12a3 of the male fitting 12 as shown in FIG. 10. This part 34a is defined by the stretch 14a1 in the example shown. The part 34c is a part with a smaller diameter R2 which is slightly larger than the diameter H1 so that this part 34c can accommodate the part 12a1 of the male fitting as shown in FIG. 10. Finally, the part 34b is a frustoconical part located between the parts 34a and 34c and has a diameter varying from R1 to R2. This part 34a is designed to accommodate the part 12a2 of the male fitting 12 as shown in FIG. 10.

At its free end, the female fitting 14 and in particular its part 14a comprises the aforementioned members 26, which are in this case two diametrically opposed notches. This free end of the female fitting 14 defines the orifice O for inserting the male fitting 12.

The female fitting 14, and in particular its part 14a, comprises two diametrically opposed slits 32 through which the branches 16a, 16b of the pin 16 are intended to pass. Each slit 32 has an elongated shape in the circumferential direction around the axis X. For example, each slit 32 has a circumferential extent greater than or equal to 30° around the axis X.

The female fitting 14, and in particular its part 14a, also comprises two diametrically opposed notches 38 which communicate respectively with the slits 32. The notches 38 are formed downstream of the slits 32.

In the example shown, each notch 38 is generally V-shaped or wedge-shaped and comprises a thin end 38a and a widened end 38b. The thin end 38a of the notch is located at the level of a free end of the corresponding slit 32 and communicates with this free end. The notch 38 also has an elongated shape in the circumferential direction and may have a circumferential extent similar to that of the slit 32. The widened end 38b of each notch 38 is located on the side of the other free end of the slit 32.

On the side opposite the orifice O, each slit 32 has a lateral wall 32a which lies in a plane perpendicular to the axis X. The function of this wall 32a is to guide the pin 16 during its deformation and it may extend beyond the slit 32. In the example shown, the walls 32a of the slits 32 are extended by first circumferential rims 40 provided on the female fitting 14 at its external periphery. These rims 40 are located upstream of the slits 32 and on an upper part of the fitting 14. Each of the notches 38 has a lateral wall 38c which is inclined with respect to a plane perpendicular to the axis X. The female fitting 14 comprises second circumferential rims 42 at its external periphery and at its upper end, which are axially spaced apart from the rims 40, and which form extensions 38c' of the lateral walls 38c of the notches 38. These extensions 38c' may also be inclined with respect to a plane perpendicular to the axis X. The rims 42 are located downstream of the slits 32. The rims 42 are substantially axially aligned with the rims 40.

The walls 39 of the notches 38 are designed to cooperate by axial support with the pin and in particular its branches 16a, 16b. The walls 32a and the extensions 39' are designed to cooperate with the branches 16a, 16b to guide them during their deformation.

Each of the notches 38 comprises a first (upper) part 38c which opens into the interior of the female fitting 14, and a second (lower) part which defines a step 44. The drawings, and FIG. 5 in particular, show that the slit 32 and the associated part 38c of the notch 38 form a "P".

The step 44 is configured to cooperate by radial support with a free end 28 of the corresponding branch 16a, 16b, as illustrated in FIG. 1 in particular.

The step 44 comprises a projecting wedge 44a on the side of the corresponding slit 32. This projecting wedge 44a preferably comprises a lug 46 for retaining this free end 28. On the side opposite the projecting wedge 44a or the lug 46, the step 44 is connected to a stop 48 for the pin 16.

Preferably, the steps 40 comprise outwardly oriented surfaces 40b which are parallel and which are configured to allow the free ends 28 of the branches 16a, 16b to slide.

Upstream of each slit 32, the female fitting 14 comprises an outwardly oriented cylindrical surface portion 52. The surface portions 52 are substantially axially aligned with the steps 44 and form radial bearing surfaces for the free ends 28 of the branches 16a, 16b and circumferential sliding surfaces for these free ends 28.

Each portion 52 extends around the axis X from an upper recess 50, which is substantially axially aligned with the wedge 44a of the corresponding step 44, and a lower stop 54.

The recesses 50 are substantially diametrically opposed with respect to the axis X and are configured to accommodate the free ends 28 of the branches 16a, 16b in the spaced apart position of the pin 16. These recesses 50 have an axial orientation and open out at the level of the walls 32a of the slits 32.

The stops 54 are located just below the free ends of the notches 32 opposite the rims 40, 42.

As mentioned above, the branches 16a, 16b of the pin 16 can adopt several configurations. The pin 16 can also adopt two distinct positions on the female fitting 14, namely an inoperative position and an operative position.

The inoperative and operative positions are axially spaced apart, which means that the pin 16 is moved axially on the female fitting 14 from its inoperative position to its operative position, and vice versa.

In the inoperative position illustrated in FIGS. 1, 8a and 8b, the pin 16 is inclined with respect to a plane perpendicular to the axis X and is therefore located in a plane P2 inclined with respect to the axis X. In this position, the free ends 28 of the branches 16a, 16b are located downstream with respect to the bridge 16c and bear radially against the steps 40 and in particular their surfaces 40b. The branches 16a, 16b and in particular their portions 31 are axially supported on the walls 39 of the notches 38. In addition, the free ends 28 of the branches 16a, 16b can cooperate with the lugs 46 on the one hand and the stops 48 on the other hand to be held on the steps 40. The ends of the branches 16a, 16b located on the side of the bridge 16c can cooperate by axial abutment with the walls 32a and the extensions 39' of the rims 40, 42 in order to prevent an accidental axial displacement of the pin 16 on the female fitting 14.

It is in this inoperative position in FIGS. 1 and 8a-8b that the branches 16a, 16b of the pin 16 have the spaced apart intermediate configuration referred to above. This configuration is achieved and maintained by the cooperation of the free ends 28 of the branches 16a, 16b with the steps 40 of the female fitting 14.

However, the pin 16 can retain some a mobility in the inclined plane P2 in which it is located, by sliding on the surfaces 44b of the steps 40.

In the operative position illustrated in FIG. 9 and following, the pin 16 is located in a plane perpendicular P3 to the axis X. In this position, the branches 16a, 16b of the pin 16 can adopt the two aforementioned extreme positions, spaced apart and close together, in the plane. P3

In the operative position, the portions 31 of the branches 16a, 16b are located at the level of the slits 32 and are able to pass through them by elastic return. The branches 16a, 16b then move from a spaced apart position to the close together position shown in FIGS. 9 and 10. FIG. 9 shows that in this position, the free ends 28 of the branches 16a, 16b are housed just above the stops 54, and their portions 31 are housed in the gorge 22 of the male fitting 12. The male fitting 12 is then blocked axially in the female fitting 14.

To remove the male fitting 12 from the female fitting 14, simply remove the pin 16 from the gorge 22 in the male fitting 12. To achieve this, a radial tensile force can be applied to the bridge 16c of the pin 16 to move it apart from the female fitting 14. The movement of the pin 16 is guided by the cooperation of the branches 16a, 16b with the lateral walls of the gorge 22 and is produced in the plane P3. During this movement, the free ends 28 of the branches 16a, 16b slide over the surface portions 52 and become housed in the recesses 50 which thus maintain the branches 16a, 16b in the extreme spaced apart configuration shown in FIGS. 12a and 12b. The spaced apart position of the branches 16a, 16b could also be considered as illustrated in FIG. 9 insofar as the axial position of the pin 16 remains the same, and is further illustrated by dotted lines in FIG. 10.

According to the invention, the pin 16 is moved axially from its inoperative position to its operative position by means of the male connector 12. In other words, it is the male fitting 12 itself which, when inserted into the female fitting 14, causes the pin 16 to move axially. When the male fitting 12 is inserted, its frustoconical part 14a2 rests on the portions 31 of the branches 16a, 16b. When the insertion is continued, the branches 16a, 16b slide over the part 14a2 and move apart from each other, passing from the distance D3 to the distance D2. The pin 16 is moved until it rests axially on the walls 32a of the slits 32. The pin 16 is then in the plane P3. When the axial position of the male fitting 12 in the female fitting 14 is such that the gorge 22 of the male fitting 12 is also located in the plane P3, the branches 16a, 16b are housed in the gorge 22 by elastic return.

The greater D3, i.e. the further apart the branches 16a, 16b are spaced, the less force is required to engage the male fitting 12 with the female fitting 14. D3 is therefore preferably closer to H2 than to D1. In practice, this means that the portions 31 of the branches 16a, 16b will bear on areas Z of the part 12a2 of the male fitting 12, which are closer to its larger diameter end H2 than to its smaller diameter end H1. These areas Z are illustrated schematically in FIGS. 2 and 3.

The present invention also relates to a fluid circuit for a motor vehicle, comprising at least one connector 10 as described above.

The present invention also relates to a method for assembling the fluidic connector 10, comprising the aforementioned steps of:
  mounting the pin 16 on the female fitting 14, with the pin 16 in its inoperative position, and
  engaging the male fitting 12 in the female fitting 14, this engagement causing the pin 16 to move from its inoperative position to its operative position in which said portions 31 are located at the level of said at least one slit 32 and are housed in the gorge 22 of the male fitting 12 by elastic return.

The invention claimed is:
1. A fluidic connector, comprising:
a female tubular fitting having a first axis,
a tubular male fitting having a second axis and configured to engage coaxially with the female fitting, and
a U-shaped metal pin mounted astride on the female fitting, the pin comprising two lateral branches, respective portions of the two lateral branches are configured to pass through at least one respective slit in the female fitting and to be engaged in a gorge in the male fitting to block the male fitting axially with respect to the female fitting, the pin being elastically deformable by moving the branches apart and close together and being able to adopt several configurations, between a close together configuration in which said portions are at a distance D1 from one another and are housed in the gorge, and a spaced apart configuration in which said portions are at a distance D2 from one another and allow the male fitting to be removed from the female fitting, D2 being greater than D1,
wherein the pin is axially movable on the female fitting from an inoperative position in which the branches are held spaced apart by the female fitting so that said portions are at a distance D3 from one another, D3 being between D1 and D2, to an operative position in which said portions are located at a level of said at least one slit and are able to pass through the slit by elastic return,
and wherein the male fitting comprises a part configured to be engaged in the female fitting and comprising an external diameter which is greater than D3, so that, when the male fitting is engaged in the female fitting, the part cooperates directly with said portions to move the pin from the inoperative position to the operative position.

2. The fluidic connector according to claim 1, wherein in said operative position, the pin extends substantially in a plane perpendicular to said first axis, and in said inoperative position the pin extends substantially inclined with respect to said first axis.

3. The fluidic connector according to claim 2, wherein, in said inoperative position, the pin is inclined so that free ends of the branches are located downstream from opposite ends of the branches, relative to a direction of engagement of the male fitting with the female fitting.

4. The fluidic connector according to claim 1, wherein the female fitting comprises two of the at least one slit which are substantially diametrically opposed with respect to said first axis and which each have an elongate shape in a circumferential direction about said first axis, each of the slits being configured to be passed through by one of said portions.

5. The fluidic connector according to claim 4, wherein the female fitting further comprises two notches which are substantially diametrically opposed with respect to said first axis and which communicate respectively with said slits, each of the notches having a lateral wall which is inclined with respect to a plane perpendicular to said first axis and on which one of said portions is adapted to engage by axial abutment when the pin is in the inoperative position.

6. The fluidic connector as claimed in claim 5, wherein each of the notches is V-shaped or wedge-shaped and comprises a thin end and a widened end which is located on a side of a free end of the corresponding one of the branches.

7. The fluidic connector according to claim 5, wherein each of the notches comprises a first part which opens into an interior of the female fitting, and a second part which defines a step, the step being configured to cooperate by radial abutment with a free end of the corresponding one of the branches to maintain the pin in the inoperative position.

8. The fluidic connector according to claim 7, wherein said step comprises a projecting wedge on a side of the corresponding slit, the projecting wedge comprising a lug for retaining the pin in the inoperative position.

9. The fluidic connector according to claim 8, wherein said step is connected, on the side opposite the lug, to a stop for the pin.

10. The fluidic connector according to claim 7, wherein the steps of the female fitting comprise parallel surfaces for sliding the free ends of the branches.

11. The fluidic connector according to claim 1, wherein, in the operative position, the pin is able to move in a plane perpendicular to said first axis, and in the inoperative position, the pin is able to move in a different plane.

12. The fluidic connector-according to claim 1, wherein said part of the male fitting is a frustoconical part which comprises an upstream end of smaller diameter and a downstream end of larger diameter, the part cooperating by bearing with said portions in areas which are closer to the downstream end than to the upstream end.

13. The fluidic connector according to claim 1, wherein the female fitting comprises recesses which are substantially diametrically opposed with respect to said first axis, and which are configured to accommodate bent free ends of said branches when the pin is moved from the operative position to a disassembly position in which the pin has said spaced apart configuration.

14. The fluidic connector according to claim 1, wherein, in the operative position, the pin is able to move in a plane perpendicular to said first axis, and in the inoperative position, the pin is able to move in a different plane which is inclined with respect to said first axis.

15. A fluid circuit for a motor vehicle, comprising at least one connector according to claim 1.

16. A method for assembling a fluidic connector, comprising the steps of:
   providing the fluid connector of claim 1;
   mounting the pin on the female fitting, with the pin in the inoperative position, and
   engaging the male fitting in the female fitting, the engaging causing the pin to move from the inoperative position to the operative position in which said portions are located at the level of said at least one slit and are housed in the gorge of the male fitting by elastic return.

* * * * *